US009723949B2

(12) United States Patent
Moore

(10) Patent No.: US 9,723,949 B2
(45) Date of Patent: Aug. 8, 2017

(54) BAKING PAN INSERT

(71) Applicant: Panovations, LLC, Ball Ground, GA (US)

(72) Inventor: Samuel Keller Moore, Ball Ground, GA (US)

(73) Assignee: PANOVATIONS, LLC, Ball Ground, GA (US)

( * ) Notice: Subject to any disclaimer, the term of this patent is extended or adjusted under 35 U.S.C. 154(b) by 322 days.

(21) Appl. No.: 14/602,949

(22) Filed: Jan. 22, 2015

(65) Prior Publication Data
US 2015/0201802 A1    Jul. 23, 2015

Related U.S. Application Data

(60) Provisional application No. 61/930,885, filed on Jan. 23, 2014.

(51) Int. Cl.
| | |
|---|---|
| *A47J 37/01* | (2006.01) |
| *A47J 36/16* | (2006.01) |
| *A47J 36/06* | (2006.01) |
| *B65D 25/28* | (2006.01) |
| *B65D 81/34* | (2006.01) |
| *A21B 3/13* | (2006.01) |

(52) U.S. Cl.
CPC ............... *A47J 36/16* (2013.01); *A21B 3/13* (2013.01); *A21B 3/135* (2013.01); *A21B 3/137* (2013.01); *A47J 36/06* (2013.01); *A47J 37/01* (2013.01); *B65D 25/28* (2013.01); *B65D 81/343* (2013.01)

(58) Field of Classification Search
CPC ................................ A21B 3/135; A47J 37/01
See application file for complete search history.

(56) References Cited

U.S. PATENT DOCUMENTS

| | | | |
|---|---|---|---|
| 2,294,569 A | 9/1942 | Petersen | |
| 2,391,767 A | 12/1945 | Beerend | |
| 2,501,588 A | 3/1950 | Sommers | |
| 2,663,449 A | 12/1953 | Smart | |
| D261,090 S | 10/1981 | Kapolas | |
| 6,546,850 B1 | 4/2003 | Akiyama-Warren | |
| 2010/0263552 A1 | 10/2010 | Hendrickson | |
| 2013/0341335 A1 | 12/2013 | Sitabkhan et al. | |

FOREIGN PATENT DOCUMENTS

| | | |
|---|---|---|
| FR | 2918843 | 12/2012 |
| NL | 2005643 | 5/2012 |
| WO | 2007/020629 A2 | 7/2007 |
| WO | 2013189501 | 12/2013 |

OTHER PUBLICATIONS

PCT/US2015/012473, "International Search Report and Written Opinion", Jul. 23, 2015, 16 pages.
PCT/US2015/012473, "Invitation to Pay Add'l Fees and Partial Search Report", Apr. 24, 2015, 5 pages.

*Primary Examiner* — James Sanders
(74) *Attorney, Agent, or Firm* — Kilpatrick Townsend & Stockton LLP

(57) ABSTRACT

A baking pan insert having a bottom surface and two sides, configured to rest abutting the bottom and side interior surfaces of a baking pan, and configured to slide along a length of the baking pan, for aiding in the removal of portions of a baked good from the pan. In some embodiments, a baking pan has interior surface features, such as shelves, configured to guide the baking pan insert and optionally configured to receive a lid; and a baking pan insert may be configured to receive a guide to aid in cutting the baked good along a path corresponding to an edge of the bottom surface of the insert.

20 Claims, 8 Drawing Sheets

BAKING PAN INSERT

CROSS-REFERENCES TO RELATED APPLICATIONS

The present application claims the benefit and priority under 35 U.S.C. 119(e) of U.S. Provisional Application No. 61/930,885 filed Jan. 23, 2014 entitled, "BAKING PAN INSERT," the entire contents of which is hereby incorporated by reference for all purposes.

BACKGROUND OF THE INVENTION

A baking pan is typically a flat-bottomed container made of metal, ceramic, glass, or other heat-tolerant material with sides and optional handles for aiding a user in removing the pan from an oven. Baking pans may be used to cook any of a wide variety of foods, including baked goods such as bread or pies and pasta dishes such as lasagna. Typically, foods cooked in a baking pan are removed from the pan by means of a spatula or other utensil and then plated.

Baking poses several common frustrations including: adhesion, mess, and damage to the baking implements including the pan. The first of these frustrations, adhesion, relates to the possibility of the food becoming adhered to the bottom of a pan. Attempting to remove an adhered baked good from a baking pan with a spatula or other implement can require the application of excessive force, which often results in imperfect or messy pieces of the baked good, and additionally to damage inflicted on the baking pan by the implement. Furthermore, even in the best case scenario of perfectly baked food, the appearance of the result can be easily ruined by imperfect application of the serving utensil.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments herein are directed to a baking pan insert and to a system incorporating a baking pan insert and a subset of a baking pan, guide, and baking pan lid. The subset can be all inclusive. Embodiments of the baking pan insert may include a horizontal bottom section with two substantially vertical side walls at opposing ends connected with side edges of the bottom section, such that the horizontal bottom section can rest along a bottom interior surface of a baking pan and the side walls can rest against the side interior walls of the baking pan. An insert configured in this way may slide along the bottom interior of the baking pan to separate a baked good from the pan, and may be lifted vertically by a user to remove a portion of the baked goods from the pan. Various embodiments of the baking pan insert may include a variety of features, such as handles, guides for assisting a user with cutting the baked good, and other surface features.

Embodiments of the baking pan insert may be used with a simple or conventional baking pan having a bottom, side walls and end walls. Alternatively, a baking pan insert be used with a baking pan that is specifically configured to receive the baking pan insert. For example, a custom baking pan may include shelves on opposite side walls of the baking pan that may receive structures on the baking pan insert and aid in guiding the baking pan insert as the baking pan insert is moved along the bottom of the baking pan. The shelves may be offset from an upper rim of the pan such that the pan may accommodate a lid even when the particular embodiment of the baking pan insert possesses a handle, a guide, or other features extending above the side walls of the baking pan insert. Embodiments of such systems may permit a user to easily prepare, protect, transport, and serve a baked good using the baking pan insert.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Embodiments herein are directed to a baking pan insert and to a system including the baking pan insert and a baking pan. The baking pan insert improves the process of removal of baked foods from a baking pan.

The term "baking pan" may be herein used not only to refer to baking pans according to their ordinary meaning, but may also refer to any container for cooking. The baking pan typically includes a bottom and at least two side walls.

In accordance with at least one embodiment, a baking pan insert may have a bottom and one side section (or two side sections) that abut, respectively, the bottom and one or more side walls of a baking pan. The bottom of the insert may be flat and solid, or may have one or more sharpened or beveled edges configured to allow a user to more easily separate the baked good from the bottom of the baking pan by sliding the insert along the bottom of the baking pan. In addition, food can be baked or otherwise cooked on the baking pan insert, and the baking pan insert can be used to lift the food out of the baking pan.

DETAILED DESCRIPTION OF THE DRAWINGS

Figure 1:
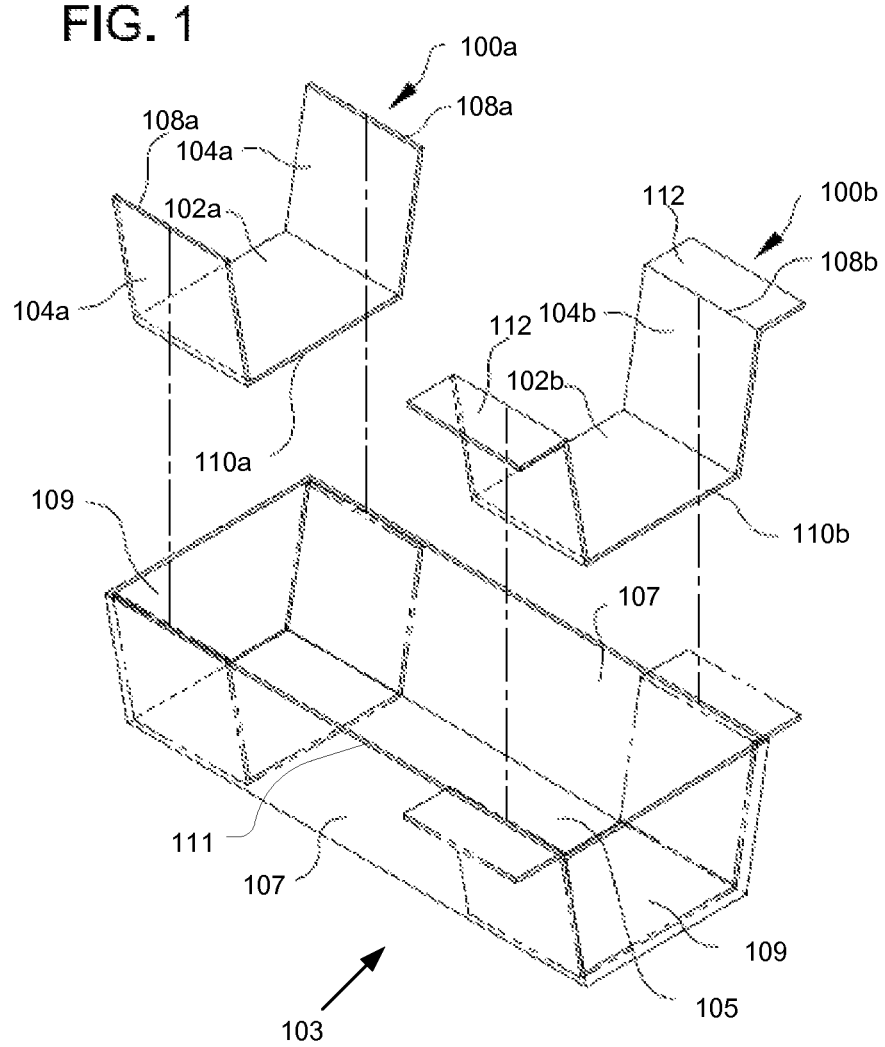
FIG. 1 is an exploded side perspective view of first and second embodiments of a baking pan insert, with an example of a baking pan, in accordance with embodiments.

Referring now to the drawings, in which like reference numbers represent like parts throughout the several views, FIG. 1 is an exploded perspective view of a first baking pan insert 100a and a second baking pan insert 100b shown before installation into a standard baking pan 103. Each of the baking pan inserts 100a and 100b includes a bottom section 102a and 102b, side walls 104a and 104b, upper side wall edges 108a and 108b, and bottom front and back edges 110a and 110b. The side walls 104a of the baking pan insert 100a terminate at top edges 108a. In contrast, the baking pan insert 100b includes flanges 112 attached to the top edges 108b of the side walls 104b, and extending horizontally outward. These flanges 112 can be used to aid a user in lifting the baking pan insert 100b.

In accordance with embodiments, baking pan inserts can be designed to fit conventional baking or pans. Standard baking pan sizes include 9"×13", 8"×8", 9"×9", 13"×18", 9"×12", 9"×13", 13"×18", 15"×21", and 18"×26". Standard baking pans, cake pans, and comparable cookware often have a depth of 1", 1 and ¼", 1 and ½", 2" or 3". Dimensions of the baking pan insert may be configured to fit along the bottom surface and opposite side walls of a conventional pan.

As an example, as shown in FIG. 1, a conventional pan 103 includes a bottom surface 105, two side walls 107 and two end walls 109. The side walls 107 are spaced evenly along the length of the pan 103. The baking pan inserts 100a and 100b are configured such that, for each of the baking pan inserts 100a and 100b, when the insert is installed in the baking pan 103, the bottom 102a and 102b of the insert rests abutting the bottom surface 105 of the pan and the side walls 104a and 104b of the insert rest abutting the side walls 107 of the pan. In embodiments, the upper side wall edges of the insert 108a and 108b align with an upper edge of the adjacent side wall 111 of the pan when the insert is installed in the pan. In various embodiments, the side walls 104a of the insert may be taller or shorter than the walls of the baking pan, but are preferably the same height or greater. In embodiments of the insert 100b having flanges 112, the flanges ideally rest at a height at or slightly above a top of the side walls 107 of a simple or conventional pan 103. Thus, for the embodiments of the baking pan inserts 100a and 100b shown in FIG. 1, the baking pan inserts are sized such that an upper side edge 108a and 108b and flange 112 rest approximately at or above the top 111 of the adjacent side wall 107 of the pan 103.

The side walls 107 of the pan 103 taper inward so that the bottom surface 105 of the pan is smaller than an upper opening of the pan. This arrangement is standard for baking pans, and is typically provided so that baked goods can more easily be removed from the pan. In accordance with embodiments, the side walls 104a and 104b of the baking pan inserts 100a and 100b match the taper of the side walls 107 of the pan, so that the side walls 104a and 104b of the insert abut the side walls 107 of the pan along the height and length of the side walls.

In embodiments, the bottom and the side walls of the insert may be a contiguous curved piece, such that a transition from the bottom section to the side walls is gradual. In specific embodiments, this gradual transition may be two bends with a large radius of curvature, for example to fit within a roasting pan having a gradual radius of curvature within its interior. In certain other embodiments, the entire insert may be predominantly 'U'-shaped to accommodate a substantially 'U'-shaped pan.

In embodiments, one or both of the front and back edges of the bottom of the insert may be sharpened or beveled, so that the insert can more readily separate a baked good from the bottom of a baking pan during a sliding operation. The bevel or sharpened edge may be on either the top or bottom side of the bottom of the insert, but the bevel may preferably be on the top surface so that the sharp edge closely abuts the bottom of the baking pan. In embodiments, the baking pan inserts can maintain this engagement as the insert is slid from one end 109 of the baking pan to the other. In this manner, an insert may slide along the bottom interior of the baking pan to separate a baked good from the pan.

In embodiments, the side walls or other sections of a baking pan insert may include a handle for aiding in the sliding operation. The handle can be large or small, and can simply be attached at one side or may extend over the insert from one side section to another. The handle(s) can be suitable for the sliding operation as described above or additionally a lifting operation, and a handle may be fixed to the insert or may be removable.

In embodiments, the insert may be configured to receive a guide for aiding in a cutting operation or in measuring a portion of the baked good. The guide can rest on the insert, removably attach with the insert, or fixedly attach to the insert. The guide may have at least one edge that aligns with at least one edge of the insert when attached. The guide may also have markings, text, or various demarcations to assist in the measuring operation. Furthermore, the guide may be shaped to accommodate an insert with an attached handle; or alternatively the guide may have a handle such that, when the guide is combined with the insert, a user may move the insert using the handle attached with the guide.

Figure 2:
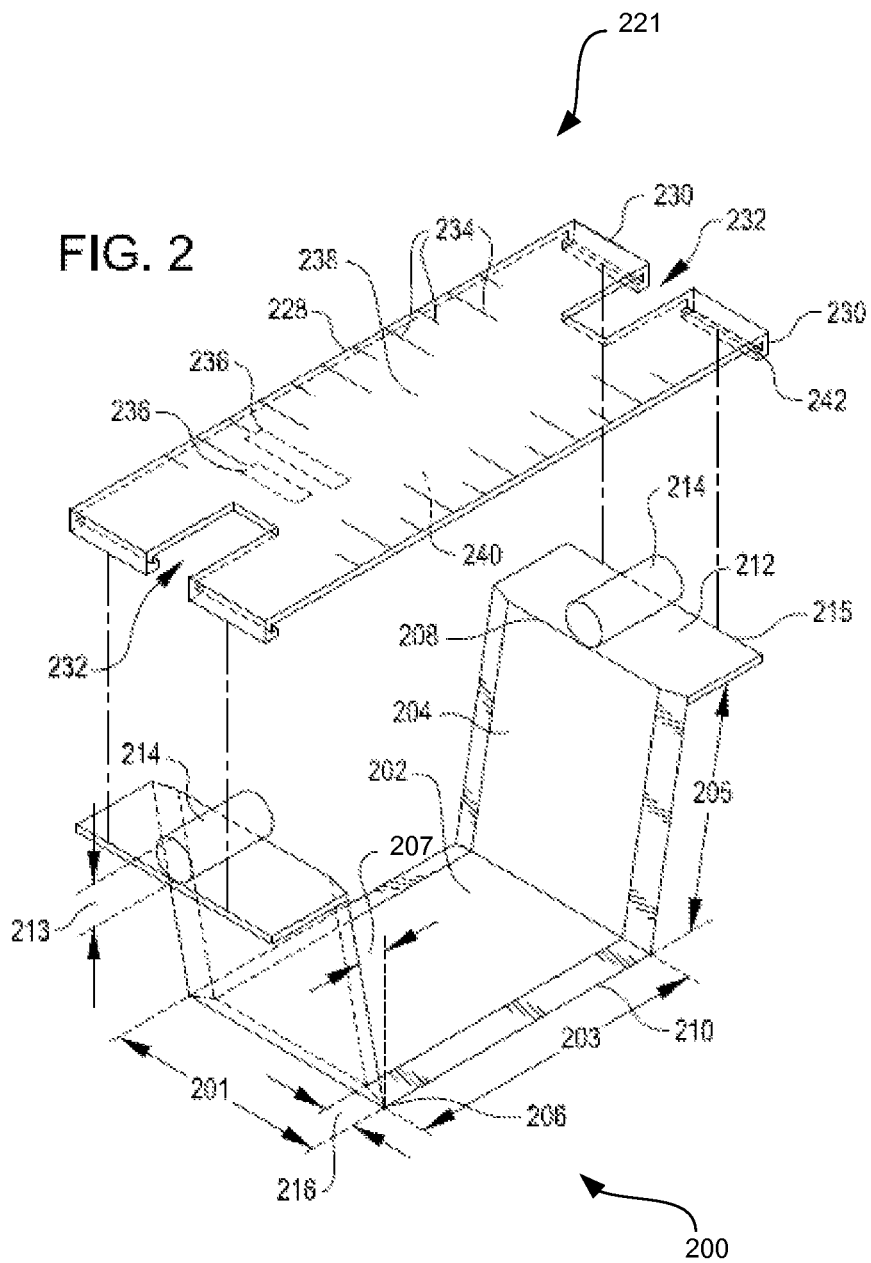
FIG. 2 is an exploded side perspective view of a third embodiment of a baking pan insert including a clip-on guide in accordance with at least one embodiment.

For example, FIG. 2 shows a third example of a baking pan insert 200 in an exploded side perspective view including a clip-on guide 221 and having handles 214, in accordance with at least one embodiment. As in the previous example of an insert 100b (FIG. 1), this example of a baking pan insert has a bottom 202, sides 204, upper edge 208, and a flange 212 at the upper edge. Handles 214 for grasping the insert and sliding the insert along the pan are attached with the flange 212 between an upper side edge 208 and flange end 215. The handles for sliding 214 have a vertical height 213 from the flange, and the insert bottom 202 has a width end-to-end 203 and a length front-edge to back-edge 201. Corners 206 where the bottom 202 meets the sides 204 may be curved to match a curved interior edge of a baking pan. Both of the edges 210 are beveled such that the front and back edges each have a sharp leading edge, with the bevel having a width 216. In various embodiments, the bevel or sharpened edge may repeat on both bottom edges of the insert or only one, may extend over the entire width of the insert bottom or a partial width, and may additionally extend up one or both of the sides, up to and including the flange 212 or along any partial range.

Also shown is an example of a detachable guide 221 for use with a baking pan insert in accordance with various embodiments. The guide 221 has a top surface 238, bottom surface 240, ends 230, and edges 228. Along one or more edges the guide may optionally have one or more demarcations 234 configured to represent any of: fractions of the width of the baking pan insert, increments of distance, increments corresponding to a serving size, or other demarcations including references to text 236. Examples of text may be numbers or prose text corresponding to any of the aforementioned demarcations, to serving sizes, to serving suggestions, to brand names or marketing terms, or any other text. The guide 221 attaches to the insert 200 by fitting on top of the flanges 212, with voids 232 configured to accommodate the insert handles 214 resting about the handles. The guide may be removably attached to the insert by clipping down vertically using attachment features 242 at one or both ends 230 of the guide.

In alternative embodiments, an attachment feature (not shown) may be included at an edge of the guide 228 rather than, or in addition to, at an end 230; or alternatively, a guide may have a stopping feature or features (not shown) overhanging an edge 228 or end 230 such that, when the guide is clipped down or slid into place, the guide is held in position by the stopping feature or features. A stopping feature may be, for example, a positive surface feature extending from the bottom surface 240 of the guide, or downward from an edge 228 or end 230 of the guide. Various embodiments of the guide may be configured to attach to the insert using the attachment features by sliding horizontally, clipping down vertically, or some combination of the two. In addition, various embodiments may have voids or geometries tailored to accommodate a variety of styles of handles of the insert.

The baking pan, baking pan insert, and guide of various embodiments may each be constructed from any material suitable for the high temperatures of baking. For example, the baking pan may be any of (or any combination of) the following: aluminum, copper, cast iron, stainless steel, carbon steel, enameled cast iron, enameled steel, clad aluminum, clad copper, or any of the above with or without a non-stick surface such as polytetrafluoroethylene (PTFE) or similar, as well as nonmetallic materials such as ceramics, glass or borosilicate glass such as PYREX®, glass-ceramics, and high-temperature silicone. The baking pan insert and the guide may be constructed of any such material above, but in at least one embodiment these elements are predominantly metallic. The baking pan insert and guide may be the same or may be different materials, and different parts of the baking pan insert, for example the insert body and the lifting handle, may be the same or may be or contain different materials. In some embodiments, the guide or a detachable handle may be formed of materials that are not suitable for high temperatures, such as plastics.

Figure 3:
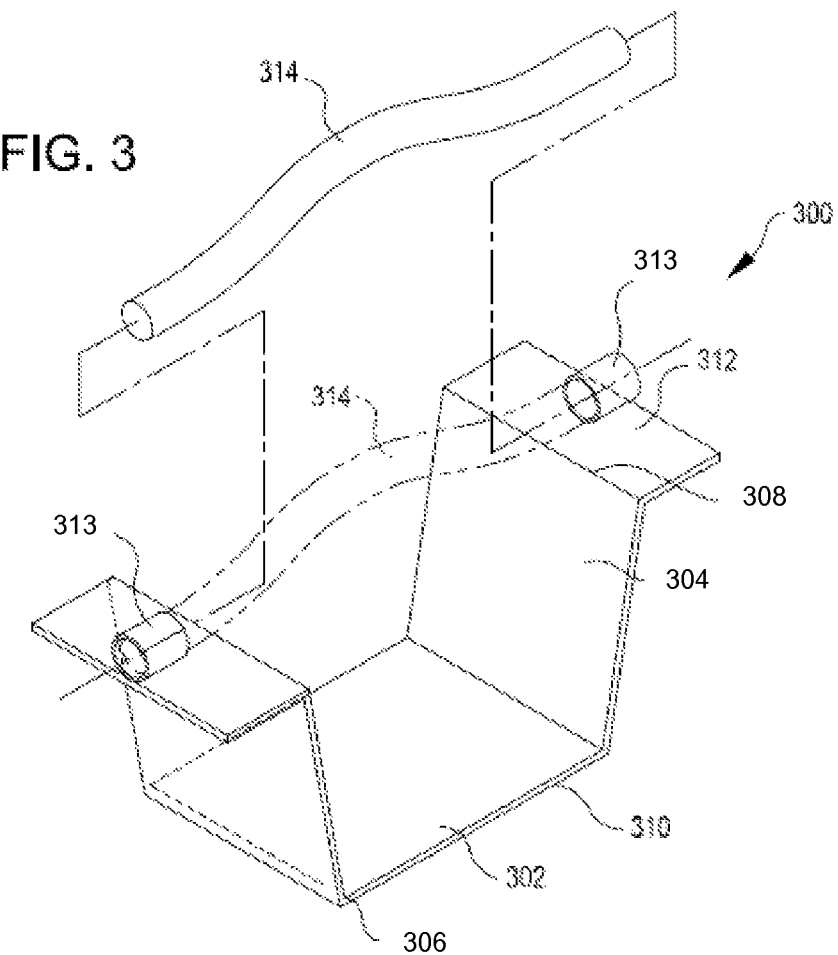
FIG. 3 is an exploded side perspective view of a fourth embodiment of a baking pan insert having a lifting handle in accordance with at least one embodiment.

FIG. 3 shows a fourth example of a baking pan insert 300 in accordance with embodiments, in an exploded side perspective view with a lifting handle 314. As in previously described examples of embodiments, the baking pan insert has a bottom 302, sides 304, corners 306, and a flange 312 connected with a top side edge 308. A lifting handle 314 is attached with the flanges 312 of both side sections 304, but in various embodiments the handle may be attached directly with a top edge 308. The lifting handle 314 is attached in a fixed orientation, but in various embodiments may be assembled able to pivot within attachment features 313 attached with the flanges 312 or with the upper edge 308 of the sides 304. In alternative embodiments, the handle 314 can be flexible, and can be removed and installed as needed. In alternative embodiments, the handle may be joined to the side sections without an intervening flange. Embodiments possessing a handle may also include any of the features herein described, such as a bevel 216 as shown in FIG. 2.

Figure 4:
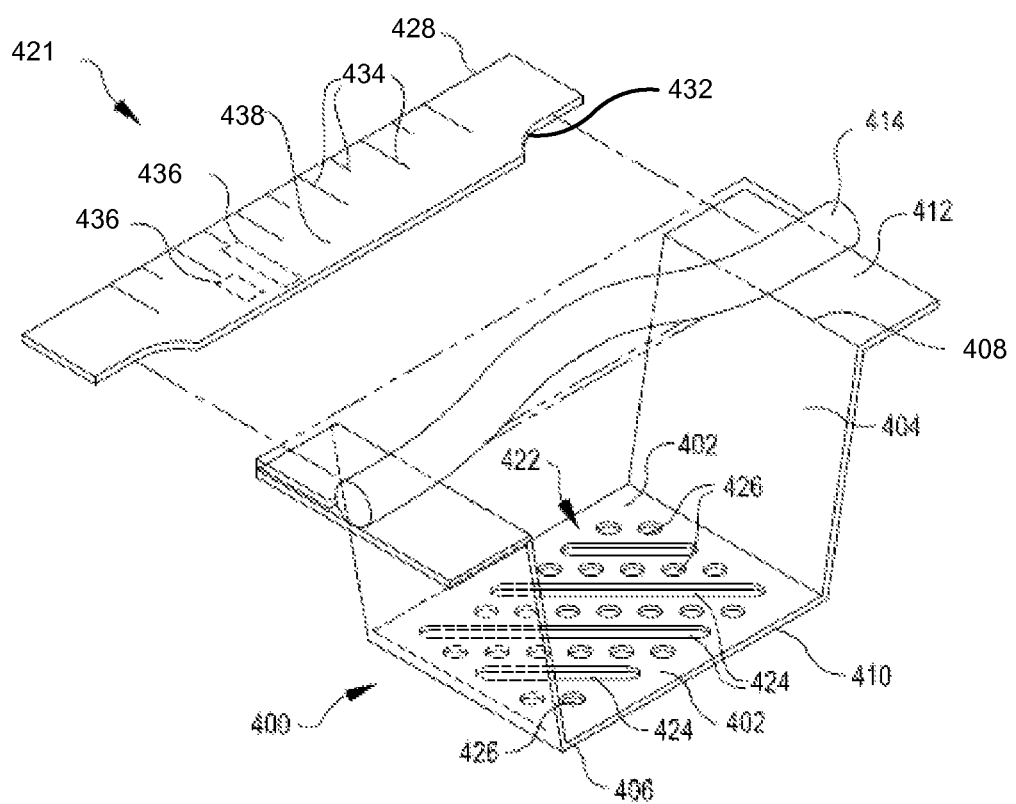
FIG. 4 is an exploded side perspective view of a fifth embodiment of a baking pan insert having a lifting handle, drainage features, and a removable guide in accordance with at least one embodiment.

FIG. 4 shows a fifth example of a baking pan insert 400 having drainage features 422, in an exploded side perspective view with an example of a removable guide 221, in accordance with embodiments. The baking pan insert, as in previously described examples, has a bottom 402, sides 404, corners 406, edges 410 upper side edges 408, and flanges 412 adjacent to the upper side edges. Features for drainage 422 include channels 424 and holes 426, but may include any other passage configured to allow fluid to pass through the insert in any of the bottom section 402 (as shown), the side sections 404 (not shown) or both. Features for drainage 422 may be included in combination with features of various embodiments. For example, as shown, embodiments with drainage features may also possess a fixed handle 414 attached with the flanges 412, and may be configured to accept a removable guide 412.

In the example of a removable guide 421, the guide is configured to rest abutting a top surface of the flanges 412, and spans a partial section of the flanges. The guide 421 may have an edge 428 and a top surface 438, the edge 428 being configured to align with an edge 410 of the insert when the guide is assembled with the insert, such that the edges are parallel and aligned one above the other. An inner edge 432 may be contoured such that the inner edge abuts a surface feature of or attached to the flange 412, for example the handle 414, for aligning the guide 421 with the insert 400. In various embodiments, the guide may be configured with attachment features to removably affix the guide to the insert; and the guide may be configured to span a greater or lesser portion of the insert, or may be reversible and attachable at either side of the handles.

Figure 5:
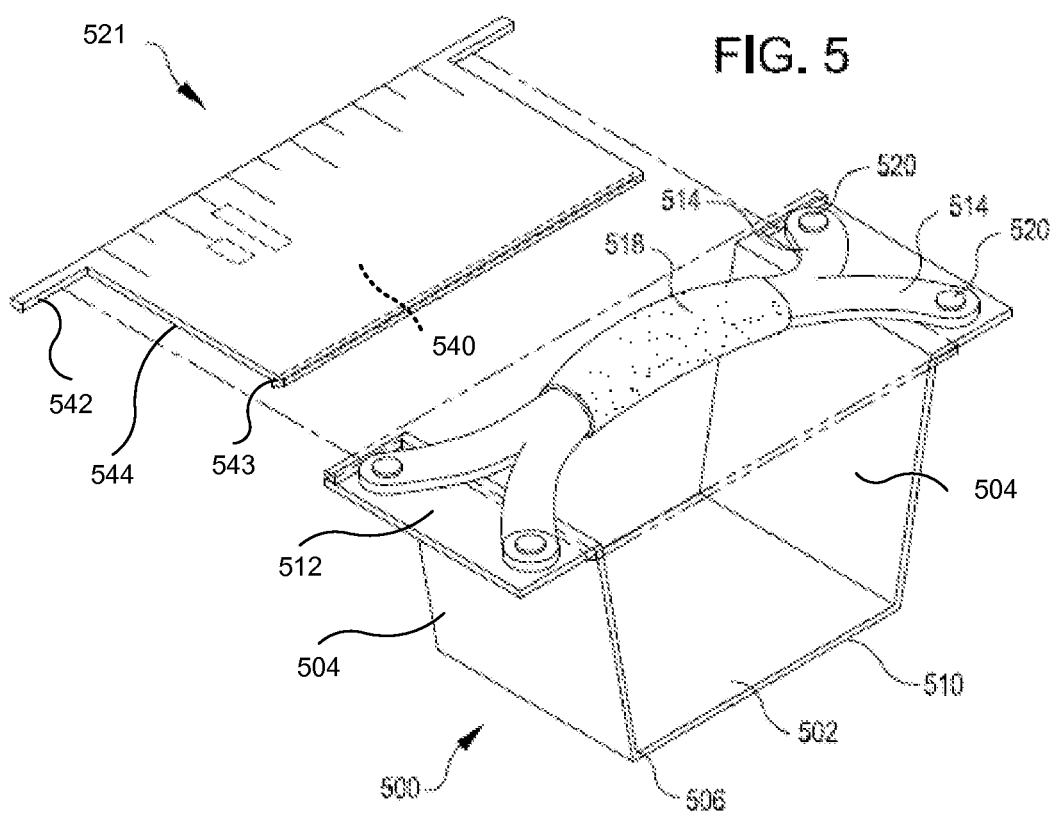
FIG. 5 is an exploded side perspective view of a sixth embodiment of a baking pan insert having a lifting handle and a removable guide in accordance with at least one embodiment.

FIG. 5 shows an example of a baking pan insert 500 having a lifting handle 514 and a removable guide 521, in an exploded side perspective view, in accordance with at least one embodiment. The baking pan insert 500 has a bottom 502, bottom edges 510 and corners 506, sides 504 and flanges 512, and a fixedly attached handle 514 having four attachment points 520 at corners of the flanges 512. The handle 514 may also have a grip 518 made up of, for example, an insulated material with lower heat conductivity than the material making up the rest of the insert, or a material that provides a better grip by way of a higher coefficient of friction. By way of example only, the baking pan insert 500 may be metallic and the insulated region 518 may be a heat-tolerant silicone. A handle having four or more attachment points may permit a user to better control the insert when sliding the insert within a baking pan or lifting the insert. Having a region of lower heat conductivity, better frictive properties, or both on the handle may also aid a user in gripping and handling the insert. The handle 514 may be attached at the attachment points by fasteners 520, such as bolts, screws, rivets, or other fasteners; or may be attached by weld points, high-temperature adhesive, physical deformation of one or more parts of the assembly, or other means of fastening.

The example of a guide 521 may have any of the features previously disclosed with respect to removable guides. In accordance with at least one embodiment, the guide 521 may possess end features 542 and clip features 543 for securing the guide 521 to the baking pan insert 500, such that the guide may accommodate a handle configuration that might otherwise impinge on other disclosed embodiments of the guide. End features 542 may include a portion of the guide that wraps about the ends of the baking pan insert flanges 512, such that the guide can be slid or snapped in place, and may include clip features 543 for securing the guide in place once attached. Embodiments may possess guide features 544, which may be shallow grooves in an inferior surface 540 of the guide that can interact with a flange 512 of the insert, or which may alternatively be raised elements on the inferior surface 540 configured to interact with, for example, the flange 512 or a section of the handle 514. In at least one alternative embodiment, the guide 521 may be fixedly attached with the baking pan insert 500, for example, the guide may be a flat sheet spanning the flanges and attached between the flanges and the handle.

Embodiments of a guide may also possess additional guide features, or channels for guiding a cutting instrument. For example, a guide may possess channels made up of narrow, straight voids at designated intervals orthogonal to the edges, to enable a user to cut a food product into portions at designated serving sizes or at fractions of a width of the pan. A series of guide features may be provided at, lengths along the guide of ¼, ½, and ¾ of the length; additionally at ⅓, and ⅔; or at any other position. Additional guide features may also run parallel to the edges at an interior of the guide and at similar fractions of the width of the guide as described above. Additional guide features may be enclosed by the guide or may penetrate an exterior perimeter of the guide.

Figure 6:
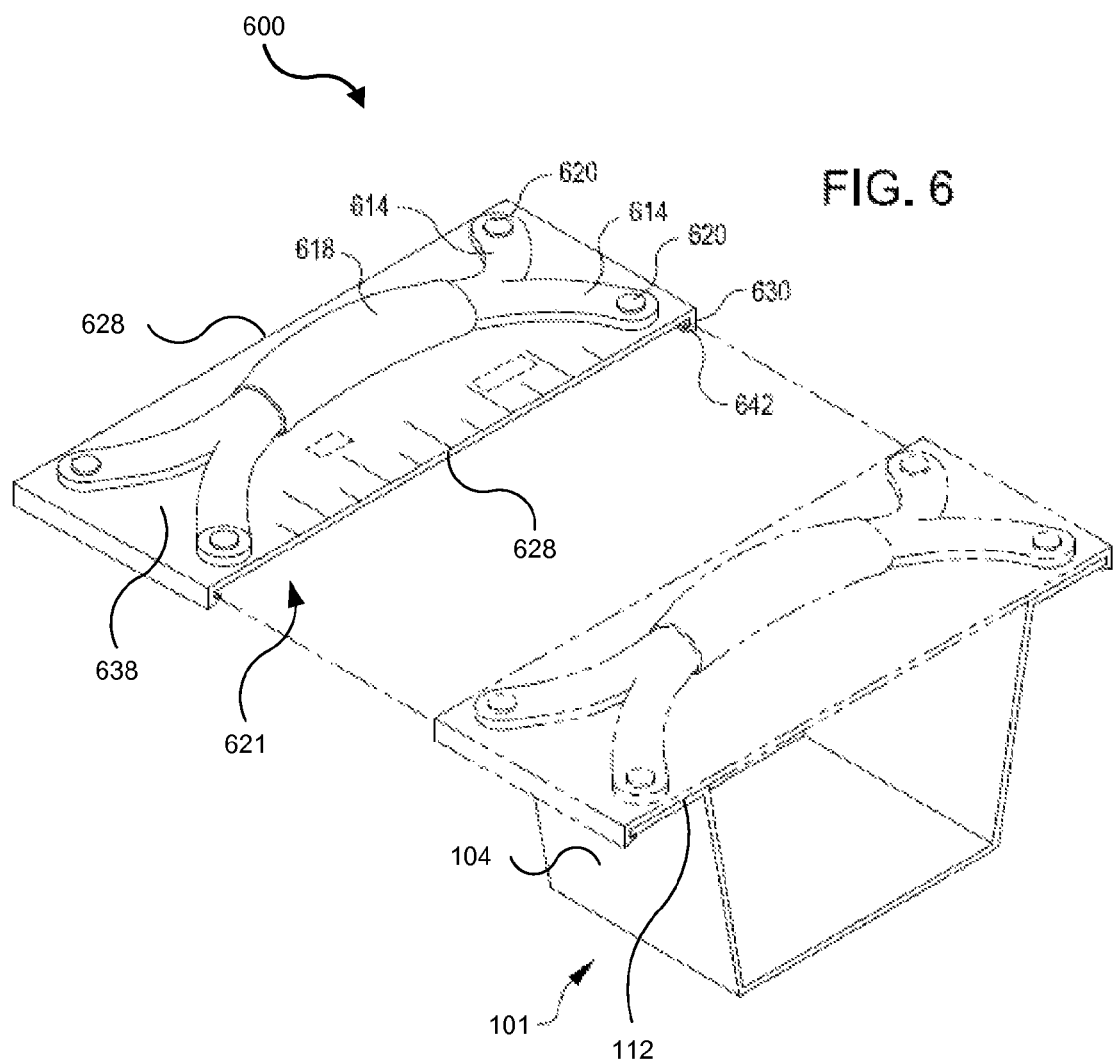
FIG. 6 is an exploded side perspective view of a seventh embodiment of a baking pan insert having a handle attached with a removable guide in accordance with at least one embodiment.

FIG. 6 shows an example of a detachable handle 600 configured to be removably attached to an embodiment of the baking pan insert 100b, in accordance with at least one embodiment, in an exploded side perspective view. The detachable handle 600 is 614 fixedly attached with an upper surface 638 of a guide 621 having ends 630 and sides 628. The guide 600 is substantially formed of a rectangular plate with ends having connecting features 642 configured to connect to the insert.

In various embodiments, the guide may have additional features such as voids or positive material features configured to accommodate attachment with other embodiments of a baking pan insert. For instance, the connecting features 642 may wrap about a portion of the ends of flanges of a baking pan insert in either a clip-on or slide-on manner, or some other mechanism for attachment. The detachable handle 600 may be removably attached to the baking pan insert by, for example, clipping the guide portion 621 down onto the insert or by sliding the detachable handle onto the flanges of the insert. Other attachment means may be suitable for various embodiments, for instance, the guide portion may have positive surface features or locking posts that insert into and attach with receiving holes in the flanges (not shown); or alternatively, locking posts (not shown) may be present on either the side sections 104 or flange sections of the baking pan insert which may insert and attach with receiving holes in the guide portion 621.

Figure 7:
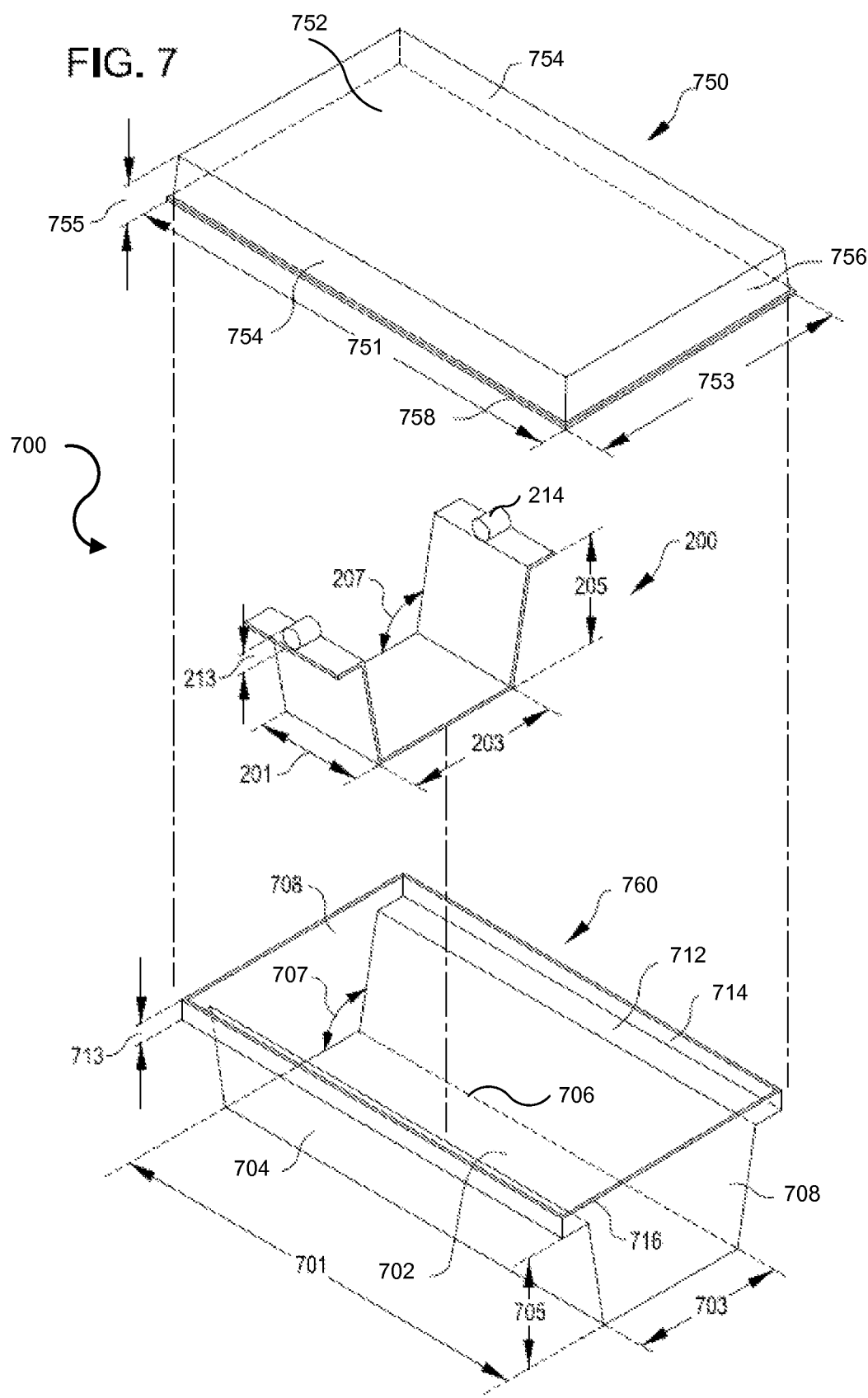
FIG. 7 is an exploded side perspective view of a system having a baking pan insert configured to fit in a baking pan with a lid, in accordance with at least one embodiment.

FIG. 7 shows a first example of a baking pan system 700 including a pan 760, the baking pan insert 200 of FIG. 2, and a lid 750, in accordance with at least one embodiment. In the first example system 700 as shown, the baking pan insert 200 from FIG. 2 is included; however, a baking pan system may be assembled using an embodiment of the baking pan insert conforming to any of the examples of the baking pan insert herein described.

The pan 760 has a bottom 702, sides 704 and ends 708, and interior edges 706 where the sides and bottom meet with interior angle 707. The interior angle 707 may in some embodiments be about 90 degrees, but is preferably greater than 90 degrees. The pan also has an interior length dimension 701, an interior width dimension 703, and an interior first height dimension 705 corresponding to a vertical distance from the bottom 702 to interior shelves 712. The pan additionally has small sidewalls 714 extending vertically from the shelves 712 to a continuous rim 716 which runs about the uppermost vertical edge of the side and end walls. The small sidewalls have a vertical height 713.

Embodiments of the baking pan insert, for example the insert 200 shown in FIG. 2, may fit within the baking pan such that a width 203 of the insert corresponds with an interior width 703 of the pan; a vertical height 205 of the insert corresponds with an interior height 705 of the pan, and a length 201 of the insert is smaller than a length 701 of the pan. In at least one embodiment, the length 701 of the pan is at least greater than 2× the length 201 of the insert. In some specific embodiments, the length 701 of the pan may be approximately an integer multiple of the length 201 of the insert. For example, the length 701 of the pan may be 4× the length 201 of the insert, or may alternatively be 2×, 3×, 5×, 6×, 8×, or other integer multiple of the length 201 of the insert. The insert may possess one or more handles 214 for sliding, or handles for lifting (not shown). The handles, if included, may have an additional height 213 which is preferably less than a height 713 of the small sidewalls 714 abutting the shelves 712 of the pan. Therefore, in embodiments of a system including a pan 760 and baking pan insert such as the insert shown 200, the insert may rest abutting the bottom, sides, and shelves of the pan in such a way that the handles are below a height of the upper rim 716 of the pan. In alternative embodiments of the insert having a lifting handle that spans the insert (not shown), the handle may be below a height of the upper rim 716 of the pan proximate to the sides 704 of the pan, but above that height at a region farther from the sides. The insert may be configured to optionally receive a removable guide (not shown).

Also shown is an example of a pan lid 750 configured to mate with the baking pan 760 in accordance with at least one embodiment. A lid 750 has a top 752, sides 754 and ends 756; and may have a length dimension 751, width dimension 753, and height 755. A connecting rim 758 is contiguous about a lower edge of the sides and ends, and is configured to mate with a rim 716 of the baking pan 760. The side and end surfaces may or may not possess an inward draft. The pan lid 750 may alternatively be configured to mate with a simple baking pan 103 such as described in FIG. 1, or may be configured to mate with a conventional size of a baking pan. For example: standard baking pan sizes include 9"×13", 8"×8", 9"×9", 13"×18", and 9"×12".

Figure 8:
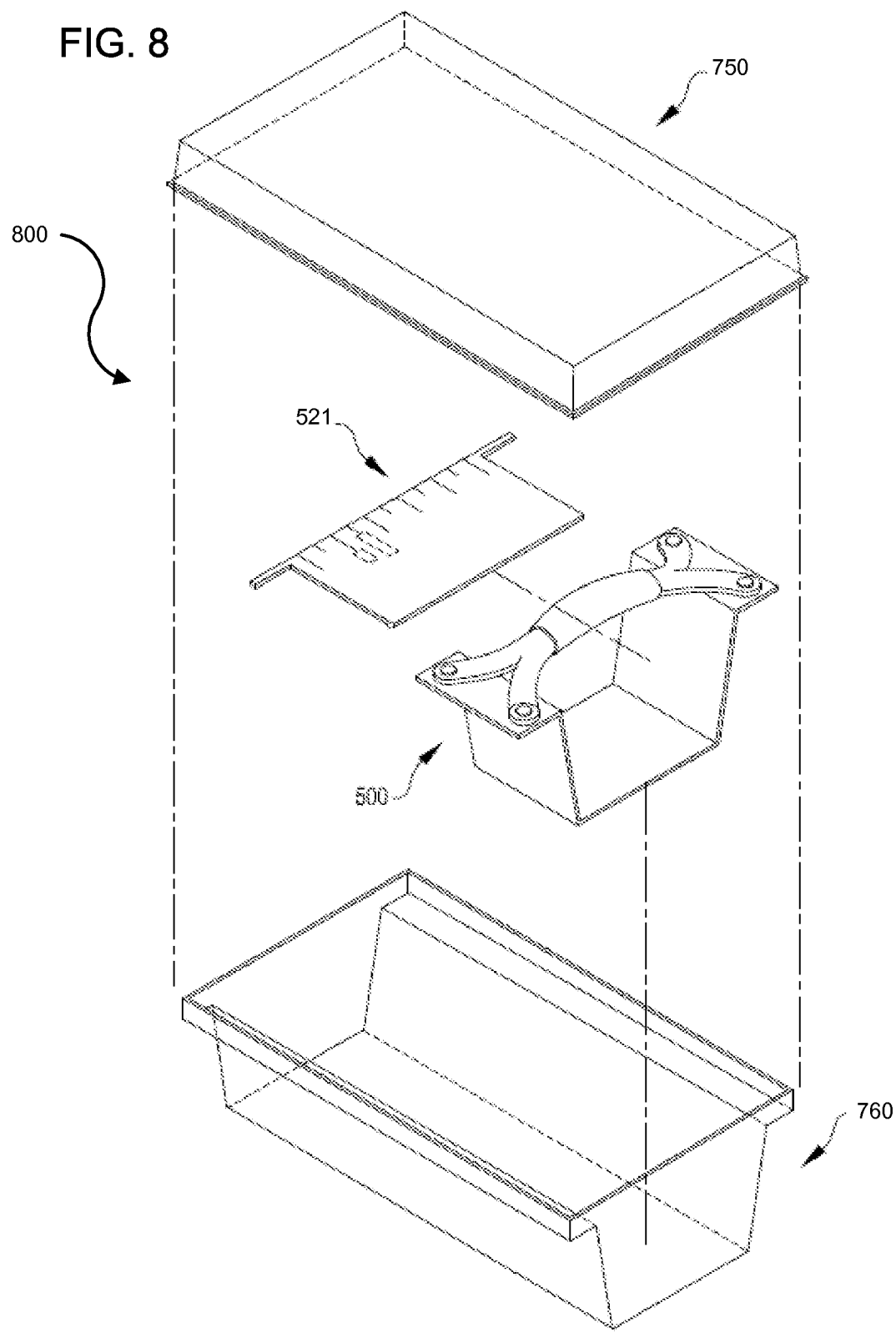
FIG. 8 is an exploded side perspective view of a second example of a system having a baking pan insert configured to fit in a baking pan with a lid with a removable guide in accordance with at least one embodiment.

FIG. 8 shows a second example of a baking pan system 800 including embodiments of a baking pan 760, baking pan lid 750, baking pan insert 500 and removable guide 521 in accordance with various embodiments. This example shows how a baking pan insert 500 having a handle may be disposed between a baking pan and baking pan lid, such that the pan and lid may be closed together about the intervening baking pan insert.

Description of the Operation of the Baking Pan Insert.

Various embodiments of the baking pan insert may be used to selectively remove a slice of a food product from a baking pan or dish. For example, a baking pan insert may be placed within a baking pan prior to the addition of at least some of the ingredients of baked goods, such that the insert can rest abutting the bottom interior surface of the baking pan prior and then during the cooking process. The baked goods may be cooked, for example, in an oven. Following the cooking process, the baking pan insert may be slid along the length of the baking pan to detach the bottom of the baked goods from the inner surface of the baking pan. The baking pan insert may then be lifted vertically to remove any part of the baked good, which may mean the removal of the entire contents of the baking pan as a single piece, or may mean the removal of selected portions, said selected portions being optionally pre-cut with a knife or other utensil. Alternatively, two or more inserts may be used simultaneously, such that multiple sections may be removed without requiring that the same insert be replaced in the pan for each removal.

The baking pan insert may also be used to selectively remove a slice of a food product that is not baked, such as a cold dish prepared without heat. For example, a baking pan insert may be placed within a baking pan prior to the addition of ingredients for a cold dish, such as JELL-O™. The cold food product may be separated from the pan by the sliding operation, as described above, and served in the same manner as a baked good.

If a guide is provided, the guide (if heat tolerant) may be included with the baking pan insert prior to cooking. If the guide is not heat tolerant, it may be affixed to the baking pan insert after the pan, baked goods, and insert have been removed together from a heat source, for example, an oven. The guide may assist a user in cutting slices that align more perfectly with a bottom edge of the baking pan insert, such that slices removed with the insert may possess a more perfectly planar vertical edge than might be achieved with conventional means, such as a spatula. Additionally, the guide may aid a user in selecting a portion size, or selecting a regular set of portions.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system for baking, comprising:
   a baking pan having a bottom and at least two pan side walls; and
   an insert configured to removably fit into and to slide within the baking pan, the insert comprising:
      a bottom section having front and back edges and two ends; and
      first and second side walls connected with the bottom section at each of the ends and extending upward from the bottom section; wherein the bottom section and two side walls of the insert are configured to fit, when the insert is installed in the baking pan, removably along and against, respectively, the bottom and two of the at least two pan side walls of the baking pan; wherein the insert is open above each of the front and back edges, and wherein the insert is operable to slide along a length of the baking pan to detach a bottom of baked goods from an inner surface of the baking pan.

2. The system of claim 1, wherein the insert further comprises:
   first and second flanges connected with the first and second side walls and located proximate to an upper edge of each side wall, the flanges extending substantially horizontally outward away from each other.

3. The system of claim 2, wherein the insert further comprises:
   one or more handles, the one or more handles being connected with at least one of the first and second flanges.

4. The system of claim 2, wherein
   the pan comprises four pan side walls and a top perimeter; and
   a height of the first and second side walls is greater than a height of the top perimeter of the baking pan such that the first and second flanges overhang the perimeter of the baking pan when the insert and pan are assembled.

5. The system of claim 2, wherein the insert further comprises:
   a handle connected with each of the first and second flanges and extending across a space between the flanges.

6. The system of claim 5, wherein the handle is connected to each of the first and second flanges at two or more attachment points on each flange, the attachment points on each flange being separated in a direction parallel with the ends of the bottom section.

7. The system of claim 2, wherein the baking pan further comprises:
two shelves comprising at least a horizontal step in each of two of the at least two pan side walls, each of the two shelves being configured to receive one of the horizontal flanges of the insert.

8. The system of claim 1, further comprising:
a lid having a rim, a top surface, and a bottom surface; the lid being dimensioned to cover the baking pan and to extend over the insert when the insert is installed in the pan, and being configured to removably attach with the baking pan at a top perimeter of the baking pan; wherein
the insert further comprises one or more handles; and
a height of an upper surface of the one or more handles is less than a height of a bottom surface of a lid when the baking pan, insert, and lid are assembled, such that the one or more handles do not impinge on the lid when the pan, insert and lid are assembled together with the insert installed in the baking pan.

9. The system of claim 1, wherein the bottom section of the insert comprises:
a plurality of openings, the openings being configured to allow the passage of liquid.

10. The system of claim 1, wherein the bottom section of the insert and the side walls of the insert comprise a contiguous piece, wherein each of the first and second side walls is connected with the bottom section at a bend.

11. The system of claim 1, wherein;
the bottom section of the insert and the side walls of the insert comprise a contiguous, curved piece, such that a transition from the bottom section to the side walls is a gradual arc; and
the bottom and at least two pan side walls of the baking pan comprise a continuous, curved inner surface.

12. The system of claim 1, wherein the insert further comprises:
at least one of the front and back edges comprising a sharpened edge, the sharpened edge being configured to rest flush with the bottom of the baking pan when the insert and pan are assembled.

13. The insert of claim 1.

14. A system, comprising:
a baking pan comprising a bottom and at least two pan side walls;
an insert comprising a bottom section and two side walls; the bottom section having a width, a length, front and a back edges running parallel to the length, and two ends parallel to the width; each side wall being connected with an end of the bottom section; and the insert being configured to removably engage the bottom and two of the at least two sides of the baking pan; and
a guide comprising an upper surface, a lower surface, a guide edge and two ends, the guide being removably connectable with the two side walls of the insert proximate to a top edge of each of the side walls; wherein the guide edge is configured to be substantially parallel and aligned with at least one of the front and back edges of the bottom section when the insert and guide are connected, and configured to aid in a cutting operation by placing a cutting instrument adjacent to the guide edge and drawing the instrument along a substantially vertical plane coincident with the guide edge and at least one of the front and back edges of the insert; wherein the insert is open above the front and back edges.

15. The system of claim 14, wherein
the insert further comprises two substantially horizontal flanges connected with the top edge of each of the two side walls; and wherein
the guide is configured to be connected with at least one of the two flanges.

16. The system of claim 14, wherein
the guide further comprises one or more of: markings, text, symbols, and channels for guiding a cutting instrument denoting one or more of: a fraction of a length of the guide, a portion size, and a length.

17. A method of preparing food in a pan, comprising:
in a system comprising:
a baking pan having a bottom and at least two pan side walls; and
an insert configured to removably fit into and to slide within the baking pan, the insert comprising:
a bottom section having front and back edges and two ends; and
first and second side walls connected with the bottom section at each of the ends and extending upward from the bottom section; wherein the bottom section and two side walls of the insert are configured to fit, when the insert is installed in the baking pan, removably along and against, respectively, the bottom and two of the at least two pan side walls of the baking pan; wherein the insert is open above each of the front and back edges, and wherein the insert is operable to slide along a length of the baking pan to detach a bottom of baked goods from an inner surface of the baking pan;
installing the insert into the baking pan such that the bottom of the insert abuts the interior bottom of the baking pan and the two insert side walls of the insert abut each of the two pan side walls of the baking pan;
preparing a food product within the baking pan by at least combining one or more ingredients within the baking pan; and
removing a subset of the food product using the insert.

18. The method of claim 17 further comprising:
separating the food product from the pan by sliding the insert along the bottom of the baking pan between the food product and the pan.

19. The method of claim 17 wherein removing comprises lifting the insert.

20. The method of claim 17 further comprising:
using a guide attached with the insert to align cutting a portion of the baked good.

* * * * *